(12) United States Patent
Mentze et al.

(10) Patent No.: US 10,277,501 B2
(45) Date of Patent: Apr. 30, 2019

(54) METHODS FOR HANDLING CONFLICTS IN A MULTICAST ROUTING ELECTION

(75) Inventors: Duane Mentze, Roseville, CA (US);
Mark Gooch, Roseville, CA (US);
Steven Glen Jorgensen, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 603 days.

(21) Appl. No.: 13/980,901

(22) PCT Filed: Jan. 31, 2011

(86) PCT No.: PCT/US2011/023152
§ 371 (c)(1),
(2), (4) Date: Jul. 22, 2013

(87) PCT Pub. No.: WO2012/105936
PCT Pub. Date: Aug. 9, 2012

(65) Prior Publication Data
US 2013/0294448 A1   Nov. 7, 2013

(51) Int. Cl.
*H04L 12/705*   (2013.01)
*H04L 12/761*   (2013.01)

(52) U.S. Cl.
CPC ............ *H04L 45/18* (2013.01); *H04L 45/16* (2013.01)

(58) Field of Classification Search
CPC ......... H04L 45/02; H04L 45/16; H04L 45/22; H04L 45/28; H04L 45/58; H04L 69/40
USPC ............................ 370/254–350; 709/201–213
See application file for complete search history.

(56) References Cited

U.S. PATENT DOCUMENTS

| | | | |
|---|---|---|---|
| 7,289,505 B2 | 10/2007 | Sanchez et al. | |
| 7,522,596 B2* | 4/2009 | Fine et al. | 370/390 |
| 7,644,177 B2* | 1/2010 | Kouvelas | H04L 12/18 709/228 |
| 7,860,093 B2* | 12/2010 | Shepherd | H04L 45/16 370/390 |
| 9,031,070 B2* | 5/2015 | Mentze | H04L 45/122 370/390 |
| 2004/0080014 A1 | 4/2004 | Ryoo | |
| 2007/0286093 A1 | 12/2007 | Cai et al. | |
| 2008/0095160 A1 | 4/2008 | Yadav et al. | |

(Continued)

FOREIGN PATENT DOCUMENTS

| CN | 1754353 | 3/2006 |
|---|---|---|
| CN | 1754353 A | 3/2006 |

(Continued)

OTHER PUBLICATIONS

M. Handley, I Kouvelas, T. Speakman, L. Vicisano, Network Working Group Request for Comments : 5015 Category : Standard, pp. 1-39, Oct. 2007.*

(Continued)

*Primary Examiner* — Timothy J. Weidner
*Assistant Examiner* — Debebe A Asefa
(74) *Attorney, Agent, or Firm* — Hewlett Packard Enterprise Patent Department (57) ABSTRACT

A method for handling of conflicts in a multicast routing election in a multicast network is described herein. The multicast network includes a plurality of multicast network devices. A conflict is detected in a Designated Forwarder (DF) election for a link.

20 Claims, 5 Drawing Sheets

(56) References Cited

U.S. PATENT DOCUMENTS

| | | | |
|---|---|---|---|
| 2008/0298360 A1 | 12/2008 | Wijnands et al. | |
| 2009/0161670 A1 | 6/2009 | Shepherd et al. | |
| 2010/0085898 A1 | 4/2010 | Giaretta et al. | |
| 2011/0228770 A1* | 9/2011 | Dholakia | H04L 45/586 370/390 |

FOREIGN PATENT DOCUMENTS

| | | |
|---|---|---|
| CN | 101467401 | 6/2009 |
| CN | 101467401 A | 6/2009 |
| EP | 2068500 | 6/2009 |
| EP | 2068500 A2 | 6/2009 |

OTHER PUBLICATIONS

International Preliminary Report on Patentability, dated Aug. 15, 2013, PCT Patent Application No. PCT/US2011/023152.
'Deployment Guide "Bidirectional PIM Deployment Guide"' Cisco Systems, [Online] Feb. 2008: ISR dated Oct. 27, 2011.
Interntional Search Report, dated Oct. 27, 2011. PCT Application No. PCT/US2011/023152.
M. Handley et al.: 'Bidirectional Protocol Independent Multicast (BIDIR-PIM)' Network Working Group Request for Comments: 5015 (RFC 5015), Category: Standards Track Oct. 2007; ISR dated Oct. 27, 2011.
Parsa et al., A Scalable and loop-free multicast Internet protocol, Proceedings of the Society of Photo-Optical Instrumentation Engineers (SPIE), 1997 (15 pages).

* cited by examiner

Network Device 330

| Multicast Routing Table (MRT) 340 | | | |
|---|---|---|---|
| Multicast Group | Ingress Interface (VLAN) | Egress Interface(s) (VLAN(s)) | RP Index |
| 230.0.0.1 | 1 | VLAN 10, VLAN 11 | 3 |
| 230.0.0.2 | 3 | VLAN 30 | 1 |
| 230.0.0.3 | 15 | VLAN 5, VLAN 10 | 3 |
| ... | ... | ... | ... |
| 231.0.0.1 | 10 | VLAN 20 | 0 |

| Rendezvous Point (RP) Table 345 | | |
|---|---|---|
| RP Index | RPA (IP Address) | Valid Interface(s) (VLAN(s)) |
| 1 | 10.0.0.10 | VLAN 10, VLAN 20 |
| 2 | 10.0.0.9 | 0 |
| 3 | 10.0.0.6 | VLAN 10 |
| 4 | 10.0.0.12 | VLAN 20 |
| 5 | 10.0.0.8 | VLAN 40, VLAN 45 |
| ... | ... | ... |
| 4000 | 10.0.0.23 | VLAN 5 |

METHODS FOR HANDLING CONFLICTS IN A MULTICAST ROUTING ELECTION

CROSS-REFERENCE TO RELATED APPLICATION

This application is a U.S. National Stage Application of and claims priority to International Patent Application No. PCT/US2011/023152, filed on Jan. 31, 2011, and entitled "METHODS FOR HANDLING CONFLICTS IN A MULTICAST ROUTING ELECTION".

I. BACKGROUND

Multicasting is a method for simultaneously delivering data over a network from a data source to a number of data receivers in a multicast group. Multicasting systems employ routing protocols to link the data sources to the appropriate data receivers in an efficient manner.

Multicasting networks are provided by multicast enabled nodes within or connected to an existing network. The nodes comprise multicast sources, multicast receivers and multicast routers. A multicast source is a source of the multicast data that is carried via the network to multicast receivers. The multicast routers are arranged to route the multicast packets across the network between the multicast sources and receivers.

A loop is a cyclical path which causes a packet to return to a node on the path from which node the packet has already been transmitted. For multicast traffic, route looping can pose issues. A looping multicast packet continuously generates copies as it loops, which in turn generates additional copies. These looping multicast packets begin to saturate the link which can quickly paralyze the network and significantly impact performance for routing other network traffic.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION

Bidirectional Protocol Independent Multicast (bidir-PIM), as standardized in RFC 5015, is a multicast protocol that is used to route a multicast packet from a source to multiple destinations. Routing of multicast packets in a multicast network is based on an Internet Protocol (IP) multicast address and multicast tables provided in each router element. A multicast distribution tree is created to ensure distribution to intended receivers while limiting distribution so that network segments that are not in the path between a source and receivers are not burdened with excess traffic.

In a network implementing the bidir-PIM protocol, multicast packets are sent along a shared tree. The shared tree may be represented by a (*, G) state. In any network, a single Designated Forwarder (DF) exists for each link except for a Rendezvous Point (RP) link. A Rendezvous Point Address (RPA) is used as a root of a distribution tree for a range of multicast groups. An RP link for a particular RPA is the physical link to which the RPA belongs. One router on each network link for each interface (e.g., one router per LAN per RP) is designated as the DF. A router may be elected as DF on more than one interface.

The DF forwards downstream traffic onto its link and forwards upstream traffic from its link towards the RP link. All other network devices on that link either forward multicast packets or send bidir-PIM control messages to the DF, which then forwards the control messages or network traffic towards the RP for upstream routing.

To elect a DF, all routers on a link exchange their unicast routing metric to reach the RPA. Routers advertise their own metrics using bidir-PIM control messages including offer, winner, backoff, and pass control messages. The router with the best route is elected as the DF. This effectively builds a shortest path between every subnet and the RPA without consuming any multicast routing state (i.e., no (S, G) entries are generated).

The DF election mechanism expects all offer message exchanges to occur within a time interval as tracked by a DF election timer. A router assumes the role of the DF after sending the offer messages and without receiving a better offer from a neighboring router within the time interval. At that point, a winner message is transmitted that declares to every other router on the link the identity of the winner and its metrics.

A conflict with the DF election may occur whereby multiple routers behave as the DF for a single link. This may lead to routing loops in the multicast network.

Methods for handling of conflicts in a multicast routing election in a multicast network are described herein. The multicast network includes a plurality of multicast network devices. A first network device of the plurality of multicast network devices receives a packet. It is determined whether the packet is a Designated Forwarder (DF) election winner message. Upon determining that the packet is a DF election winner message, it is determined whether a conflict is detected in a DF election for a link. A DF routing capability of the first network device is disabled upon detection of the conflict.

Figure 1:
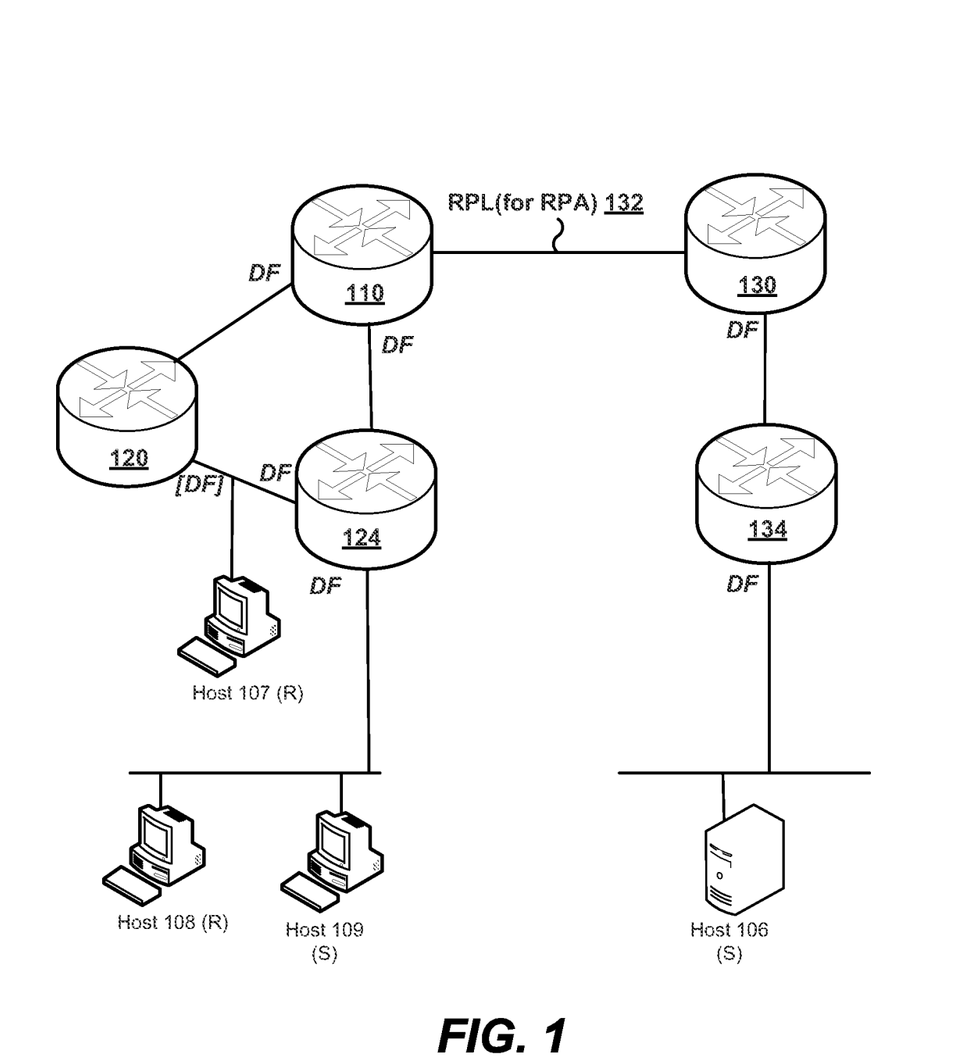
FIG. 1 is a topological block diagram of a network system in accordance with an embodiment.

FIG. 1 is topological block diagram of a network system in accordance with an embodiment. Multicasting is commonly used to distribute data over IP networks, such as network 100.

Network 100 includes a host 106, a host 107, a host 108, a host 109, and multiple bidir-PIM routers, such as routers 110, 120, 124, 130, and 134. Host 106 and host 109 are multicast sources. Host 107 and Host 108 are multicast receivers. Routers 110, 120, 124, 130, and 134 may be capable of acting as a Designated Forwarder (DF) for an interface (e.g., ULAN), for an RPA. As used herein, a DF-capable router is a bidir-PIM router that is capable of acting as a DF.

Host 106, router 134, and router 130 are operatively interconnected and the connection among them may include multiple network segments, transmission technologies and components.

Router 134 is generally configured to process and transfer data in network 100. Router 134 is an edge device on the edge of a network, such as remote network 100. As used herein, an edge device is a network switch, router, or other network device on the edge of a network. Host devices connect directly to the edge device via an edge port.

Router 130 is operatively coupled to router 110 and router 134, and is configured to process and transfer data in a network, such as network 100. Router 110 is operatively coupled to router 120, router 124 and router 130. Furthermore, router 110 is configured to process and transfer data in a network, such as network 100

Router 120 is operatively coupled to router 110 and router 124, and is configured to process and transfer data in a network, such as network 100. Router 124 is operatively coupled to router 120 and router 110, and is configured to process and transfer data in network 100. Router 124 is an edge device on the edge of a network, such as network 100.

A Rendezvous Point Address (RPA) is used as a root of a distribution tree for a range of multicast groups. In bidir-PIM, the RPA is a routable address, which need not reside at a physical router interface. For any particular RPA, the multicast distribution tree is a shared tree of a multicast flow, denoted (*, G) where is a wildcard notation representing all sources and G is the multicast group address.

A Rendezvous Point Link (RPL) for a particular RPA is the physical link to which the RPA belongs. RPL 132 is a physical link between router 110 and router 130, and is the physical link to a particular RPA.

Typically, the DF decides what packets are to be forwarded. Using the shared tree, the DF distributes traffic upstream (i.e., from the sources to the RPA) and downstream (i.e., from the RPA to receivers).

For each link, except for the RPL such as RPL 132, an election is performed to select a DF. As previously mentioned, all routers on a link exchange their unicast routing metric to reach the RPA. Routers advertise their own metrics using offer, winner, backoff, and pass control messages. The router with the best route is elected as the DF.

For example, router 134 is the DF on the link between host 106 and router 134. Router 130 is the DF on the link between router 134 and router 130. Router 110 is the DF for the link between router 124 and router 110. Router 124 is the DF for the link between router 120 and 124. Router 110 is the DF for the link between router 110 and 120. Finally, router 124 is the DF for the link between router 124 and hosts 108 and 109.

A conflict in the election process may occur, such that more than one multicast router behaves as a DF on the same link. For example, both router 120 and router 124 may believe they are the elected DF. Such a situation arises, for example, when router 120 is the initial DF for the link between router 120 and router 124. Router 124 is initially inactive. Router 124 becomes active in network 100 and initiates an election. Per RFC 5015, various conditions may trigger the initiation of a DF election, including when a new PIM neighbor starts up on a link. To initiate the DF election, router 124 sends an offer message(s) to all PIM neighbors (e.g., router 120) on the link and a DF election timer may be started. The DF election timer may be set to any configurable time interval, such as the Election_Robustness*Offer_Period interval which is described in RFC 5015 as the interval to wait in order to give a chance to a router with a better offer to become the DF.

Router 124 expects to receive DF election messages from the PIM neighbors during the DF election time interval. Router 124 assumes the role of the DF after sending the offer message(s) and without receiving a better offer from router 120 within the time interval.

Router 120 may appear to have failed to respond to a DF election message for at least the following reasons: router 120 may have failed to respond within the DF election time interval, router 120 may not have received the offer message(s) from router 124, or the response by router 120 may not have been received by router 124. As such, at the expiration of the DF election timer, router 124 assumes the role of the DF, and transmits a winner message to router 120 declaring itself as the winner DF. At this point, both router 120 and router 124 are acting as the DF for the same link.

When more than one router behaves as the DF, multicast routing loops may occur. For example, host 107 and host 108 are receivers for the multicast group of a particular multicast packet sent from host 106, which is the source of the packet. Host 107 is on the link between router 120 and router 124. Router 120 and router 124 both see the join of host 107 to the multicast group and both believe they are responsible for delivering traffic on that link. To illustrate, the packet from host 106 is routed to router 134, which then forwards to router 130, which then forwards to router 110. Router 110 forwards the packet to router 120, since host 107 is a valid receiver. Router 110 also forwards the packet to router 124, since host 108 is a valid receiver. Upon receiving the packet from router 110, router 120 forwards the packet to host 107 which is on the link between router 120 and router 124. Likewise, upon receiving the multicast packet from router 110, router 124 forwards the multicast packet to host 108 and on the link between router 120 and router 124. When router 124 receives the multicast packet from router 120, it forwards the packet towards RPL 132, i.e., to router 110. Again, router 110 forwards the multicast packet to router 120 and router 124. In other words, if a router receives a "downstream packet" (i.e., one sent away from the RPL) on a link for which it is the DF, a loop forms as the router will re-send the packet back to the RPL as an "upstream packet". The result is a multicast routing loop, which severely impacts the performance of network 100.

In operation, multicast routers in network 100 may be configured to handle conflicts in multicast routing elections. Any of these routers may receive a packet, determine that the packet is a DF election winner message, detect a conflict with the DF election, for example by determining that more than one router is acting as the DF for a link; and may disable its own DF routing capabilities for the link.

Continuing with the example previously described, both router 120 and router 124 believe they are the DF for the link between them. Router 124 sends a DF election winner message announcing itself to be the DF for the link. Router 120 receives the DF election winner message, and determines there is a conflict with the DF election, for example, by determining that both it and router 120 have assumed the role of DF for the same link. Router 120 disables its own DF routing capabilities. When the multicast packet from source host 106 is forwarded from router 110 to router 120, the multicast packet is not forwarded to router 124. As such, the routing loop may be avoided.

A single RPA is described herein, however, a number of additional RPAs and associated groups may be set up over the same IP network 100. Each such additional group may use at least one of routers 110-134, any one of which may be designated as the DF for other multicast groups.

Embodiments can also be applied in other network topologies and environments, Network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2A:
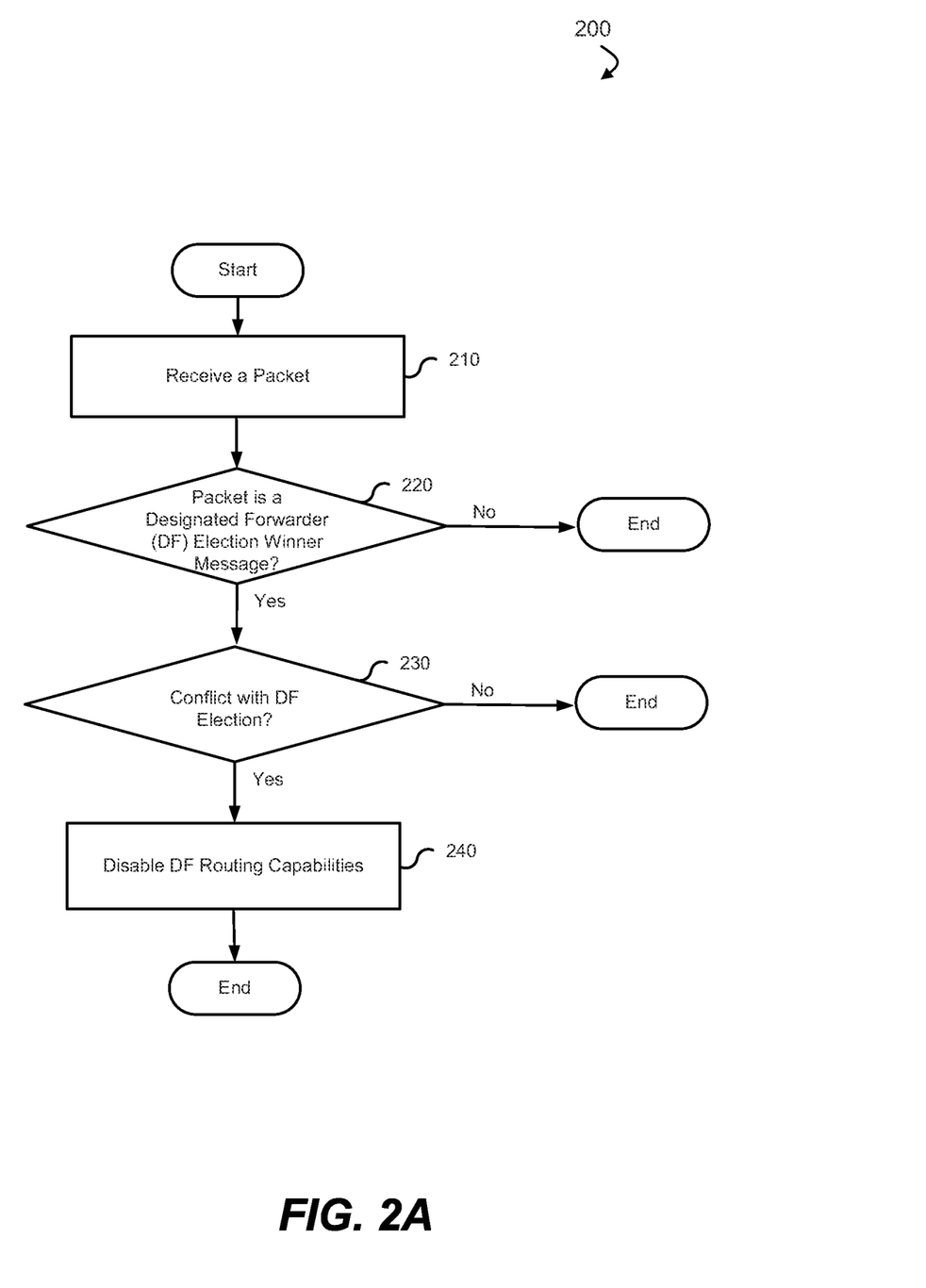
FIG. 2A is a process flow diagram for conflict handling in a multicast routing election in accordance with an embodiment.

FIG. 2A is a process flow diagram for conflict handling in a multicast routing election in accordance with an embodiment. The depicted process flow 200 may be carried out by execution of sequences of executable instructions. In another embodiment, the process flow 200 is carried out by components of a network device, an arrangement of hardware logic, e.g., an Application-Specific Integrated Circuit (ASIC), etc. For example, steps of process flow 200 may be performed by a conflict handler circuit of a multicast network device.

In a multicast network implementing the bidir-PIM protocol, multicast network devices are configured to handle conflicts that occur in a multicast routing election. Typically, a DF election is performed for a link on a per-interface and per-RPA basis. At step 210, a packet is received, for example at the multicast network device. At step 220, it is determined whether the packet is a DF election winner message. A DF election winner message is a PIM control message that is used during the election process. Where the packet is not a DF election winner message, processing ends.

Where the packet is a DF election winner message, it can be determined that the sender of the packet is assuming the role of the DF on the link between the sender and the receiver. At step 230, it is determined whether there is a conflict with a DF election. A conflict with a DF election may occur when multiple routers behave as the DF for a single link. It may be determined whether the multicast network device that received the packet believes itself to be the DF for the same link upon which the sender has assumed the DF role. If both the sender and the receiver assume the role of the DF for the same link, on the same interface, and for the same RPA, there is an election conflict. If there is no conflict, processing ends. Conflict detection is further described with respect to FIG. 2B, block 252.

After an election conflict is detected, the DF routing capabilities are disabled, at step 240. For example, the DF routing capabilities of the multicast network device that received the packet at step 210 is disabled. Specifically, the routing hardware in the receiver ceases all DF routing functions associated with the link for a specific interface and RPA. Routing disablement is further described with respect to FIG. 2B, block 253.

Typically, if a multicast routing loop gains traction, it can overwhelm a processor of the multicast router due to the looped traffic. By halting the routing functions in hardware, multicast routing loops caused by election conflicts may be minimized or prevented, reducing the volume of looped traffic. An interrupt or other message may be sent to a processor in the receiver multicast device, providing notification that a conflict was detected. The processor can then undertake measures to correct the election conflict, for example, by initiating a new DF election. The benefits of performing the election conflict detection and routing disablement in hardware include fast execution, which minimizes the amount of time a loop is in existence. Furthermore, processor intervention is not involved, which means it is not affected by the processor being busy or otherwise occupied.

Figure 2B:
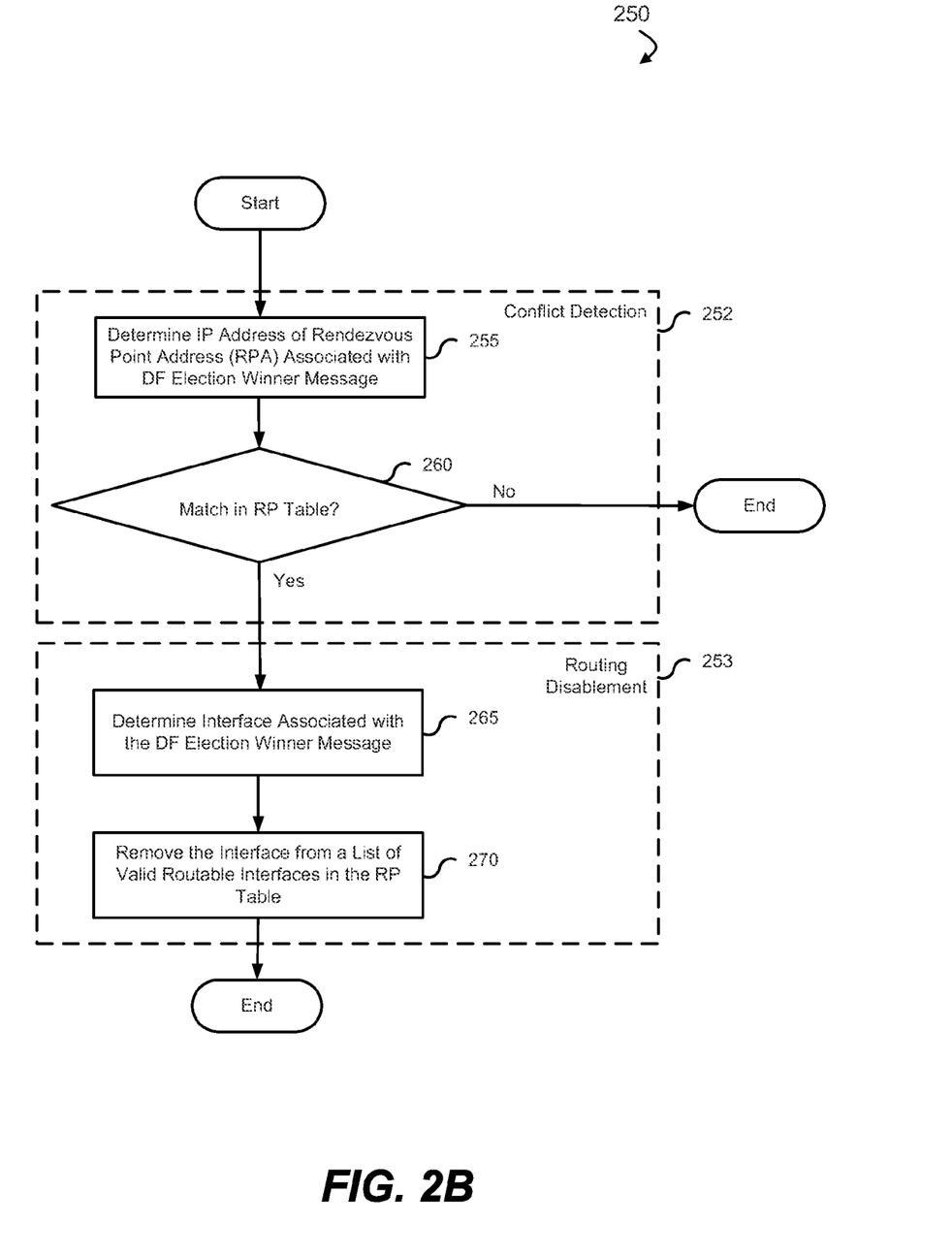
FIG. 2B is a process flow diagram for conflict detection and routing disablement in accordance with an embodiment.

FIG. 2B is a process flow diagram for conflict detection and routing disablement in accordance with an embodiment. The depicted process flow 250 may be carried out by execution of sequences of executable instructions. In another embodiment, the process flow 250 is carried out by components of a network device, an arrangement of hardware logic, e.g., an Application-Specific Integrated Circuit (ASIC), etc. For example, steps of process flow 250 may be performed by a conflict handler circuit of a multicast network device.

In a multicast network implementing the bidir-PIM protocol, multicast network devices are configured to handle conflicts that occur in a multicast routing election. Typically, a DF election is performed for a link on a per-interface and per-RPA basis. As previously mentioned, conflict detection at step 252 of process flow 250 further describes step 230 of FIG. 2A, i.e., determining whether there is an election conflict. Routing disablement at step 253 of process flow 250 further describes step 240 of FIG. 2A, i.e., disabling DF routing capabilities.

A DF election winner message is received, for example by a multicast router. As previously mentioned, DF elections are specific to an RPA. As such, the winner message is an announcement that the router sending the winner message is the DF on a link for a particular RPA.

To determine whether there is an election conflict, it is determined which RPA a received winner message pertains to. At step 255, an IP address of a Rendezvous Point Address (RPA) associated with the DF election winner message is determined. The received whiner message includes the IP address of the RPA to which it pertains. The IP address is extracted from the received winner message.

At step 260, it is determined whether a matching entry in a RP table is found using the RPA from the whiner message. Each multicast router includes an RP table, which correlates IP addresses of RPAs to routable valid egress interface(s). A multicast router can be a DF on a link for various RPAs. The RP table includes a listing of all of the RPAs that are active for the network.

Using the RPA from the winner message, if a matching RPA is found in the table and the incoming interface (for the winner) exists as a valid interface for the matching RPA entry, a conflict exists. Specifically, it is determined that the multicast router assumes that it is the DF for the RPA, and that the multicast router that sent the winner message believes that it is the DF on the same link and for the same RPA.

If there is no matching entry, there is no conflict and processing ends. If there is a matching entry, there is an election conflict and the DF routing capabilities are disabled.

Disablement of DF routing capabilities at step 253 are described in greater detail through steps 265 and 270. In general, the DF routing capabilities of the multicast router are disabled for a particular RPA and for a particular interface (e.g. VLAN). At step 265, an interface associated with the DF election winner message is determined. For example, the ingress VLAN at which the winner message arrived in the multicast router is the interface. In another example, the winner message may be marked with the particular interface to which it pertains.

At step 270, the interface associated with the DF election winner message is removed from a list of valid routable interfaces in the RP table. At this point, it is understood that there is an election conflict for a particular RPA and a particular interface. By removing the interface associated with the winner message from the list of valid routable interfaces, multicast packets received at the router are no longer routed through the interface for which an election conflict was detected.

Figure 3:
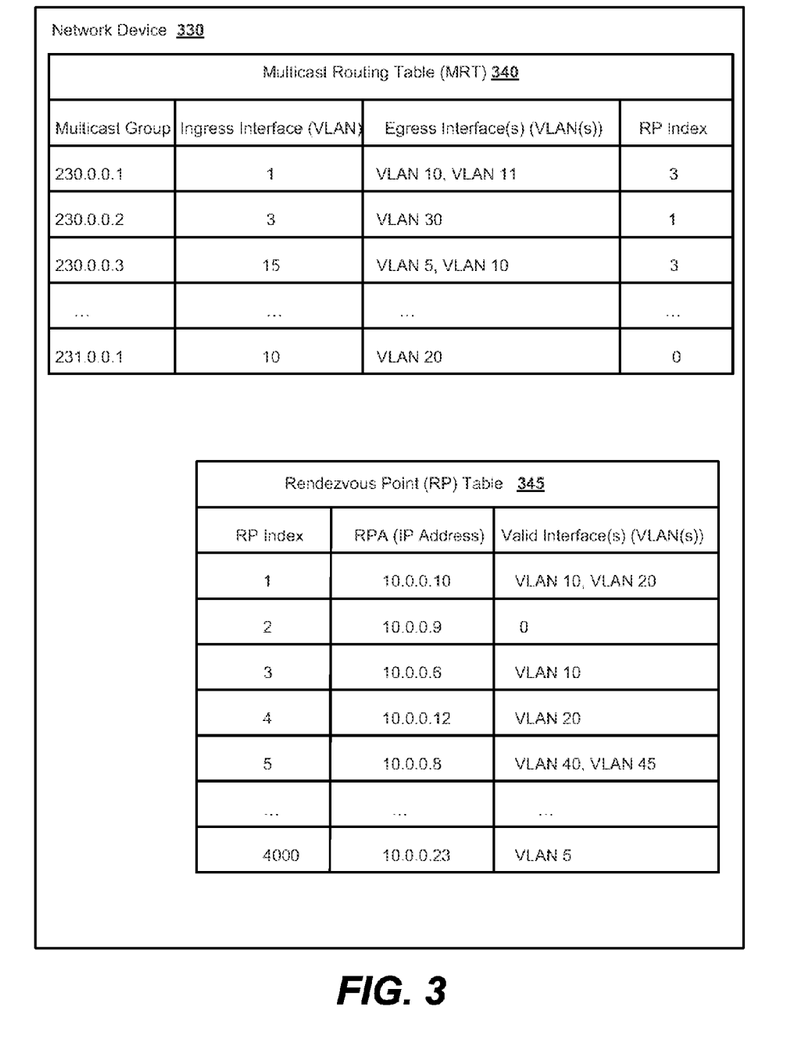
FIG. 3 is a simplified high-level block diagram of a network device in a multicast network including tables used for conflict handling and multicast routing in accordance with an embodiment.

FIG. 3 is a simplified high-level block diagram of a network device in a multicast network including tables used for conflict handling and multicast routing in accordance with an embodiment. The hardware of network device 330 includes a Multicast Routing Table 340 and a Rendezvous Point (RP) table 345.

Multicast Routing Table (MRT) 340 includes various fields such as a multicast group field, an ingress interface (ULAN) field, an egress interface(s) (VLAN(s)) field, and an RP index field. MRT 340 may be implemented as, but not limited to, a hash table, Ternary Content-Addressable Memory (TCAM), a binary tree, etc. The egress interface(s) (VLAN(s)) field is a listing of all interfaces (e.g., VLANs) through which a multicast packet is forwarded on egress. The egress interface list in MRT 340 may be implemented as, but not limited to, a bitmap, list of egress VLANs, etc. The RP index field includes an index value that is used to reference the RP table 345.

RP table 345 includes various fields such as an RP index field, an RP Address (RPA) field, and a valid interface(s) (VLAN(s)) field. RP table 345 may be implemented as, but not limited to, a hash table, TCAM, a binary tree, etc. The RPA field includes entries with the IP address of a RP address. The valid interface(s) (VLAN(s)) field is a listing of all valid interfaces through which a multicast packer may be forwarded on egress. The list of valid interfaces in RP table 345 may be implemented as, but not limited to, a bitmap, list of egress VLANs, etc.

In operation, RP table 345 is used in two ways: to detect that a conflict is present for a particular RPA and interface combination, and to disable DF routing capabilities, for example in response to the detection of a DF election conflict. With respect to detection, RP table 345 includes a listing of all of the RPAs that are active in the network. If the source router of the winner message thinks it is a DF on any of the same RPAs, then an election conflict is detected. The RPA and interface of the winner message is compared to the entries in the RPA field of RP table 345, and if a match is located, there is a conflict.

With respect to disabling of DF routing capabilities, network device 330 modifies the relevant entry in RP table 345, which effectively disables network device 330 from forwarding incoming multicast packets through the conflict-ridden RPA and interface. For example, the RPA of the winner message is 10.0.0.6 and the interface of the winner message is VLAN 11, The same RPA is located in an entry of RP table 345. There is an election conflict. VLAN 11 is removed from the valid interface(s) (VLAN(s)) field corresponding to the matching entry. As such, network device 330 is disabled from its DF routing capabilities for RPA 10.0.0.6, VLAN 11.

In typical multicast routing, a routing table is used to determine the egress interfaces for any multicast packet. As described herein, MRT 340 is used to forward multicast packets. If the RP index field is a zero value, RP table 345 is not referenced and forwarding is performed in the typical manner, i.e., the multicast packet is forwarded through the interfaces identified in the egress interface field corresponding to the relevant multicast group. This RP index field enables the use of legacy routing behavior.

Where the RP index field has a non-zero value, RP table 345 is referenced using the index value from MRT 340. The multicast packet is forwarded along the interfaces identified by applying a logical-AND function of the egress interfaces in MRT 340 and the valid interfaces in RP table 345. In other words, for a packet to be forwarded to an interface, the interface appears in both tables.

In operation, after the DF routing capabilities of network device 330 have been modified in RP table 345, the routing of regular multicast packets is limited to valid interfaces, and routing to any conflict-ridden interfaces is not permitted. Continuing with the example presented above, RP table 345 prevents the forwarding of multicast packets for RPA 10.0.0.6, VLAN 11. When a multicast packet arrives on ingress at network device 330, the multicast group and interface is determined for example by examining the packet headers and/or identifying the ingress interface at which the multicast packet arrived.

An entry in MRT 340 is located using the multicast group as the first-level index, and the ingress interface as a second-level index. If the multicast group is 230.0.0.1 and the ingress interface (VLAN) is 1, the corresponding entry in the egress interface(s) (VLAN(s)) field indicates that the multicast packet is typically forwarded through VLAN 10 and VLAN 11. Since the corresponding entry in RP index field is non-zero, the forwarding interfaces are limited according to RP table 345. Specifically, the value of '3' is used to index RP table 345. The valid interface(s) (VLAN(s)) field corresponding to RP index 3 identifies VLAN 10 as the valid egress interface. The multicast packet is forwarded through VLAN 10 which is the final egress interface that appears in both tables, and is not forwarded through VLAN 11.

It should be recognized that a single modification to the valid interface(s) (VLAN(s)) field in RP table 345 can impact multiple entries of MRT 340, which provides greater efficiencies in implementation. For example, a modification to RP index 3 in RP table 345 impacts at least two entries of MRT 340 (i.e., entries with RP index values of 3).

In one embodiment, network device 330 is included in a chassis with multiple blades therein. Each blade includes its own set of multicast routing tables and rendezvous point tables. When a modification is made to an entry in a table of one blade, the modification is then propagated to all blades on the chassis. For example, when the conflict is detected at one blade, the DF election winner packet (i.e., conflict packet) is propagated to all blades on the chassis. The modification is also propagated in a stack implementation.

Figure 4:
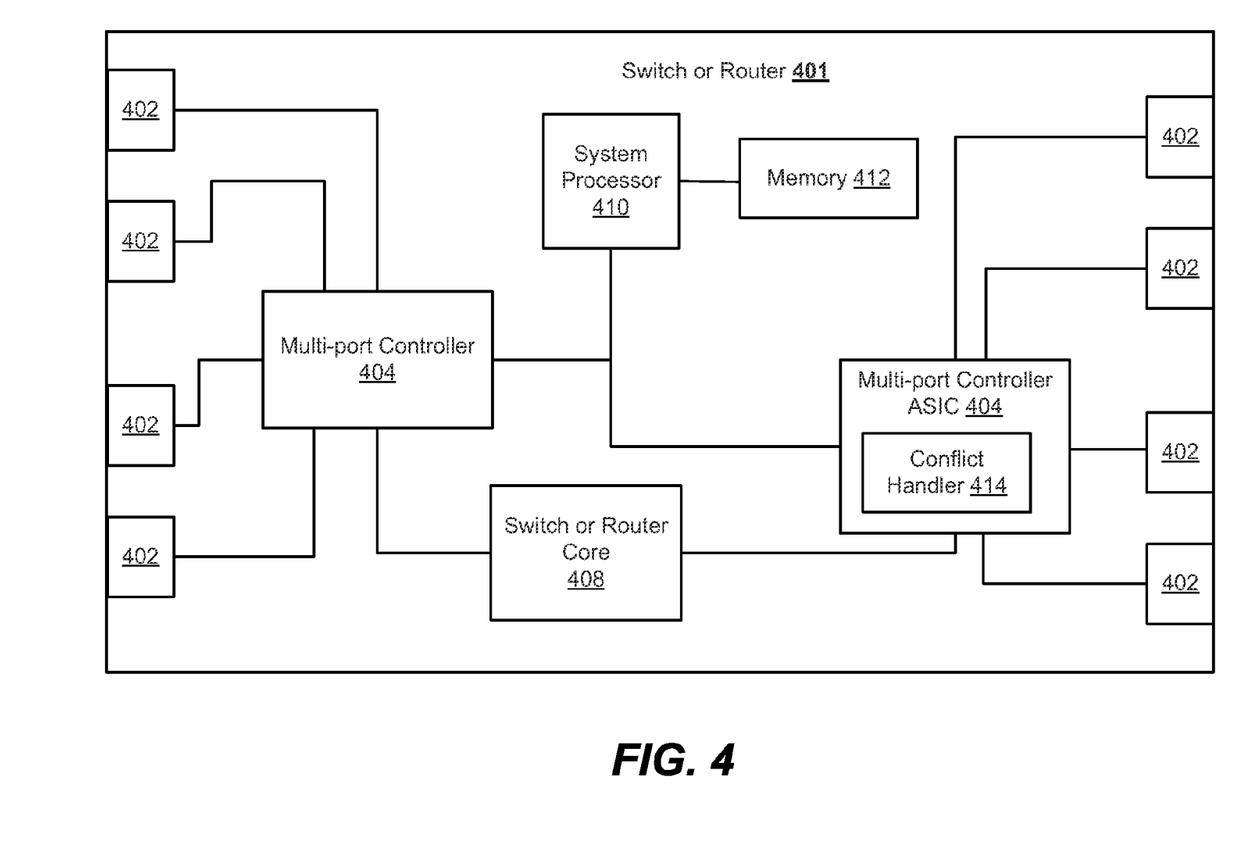
FIG. 4 is a block diagram of a switching or routing device in accordance with an embodiment.

FIG. 4 is a block diagram of a switching or routing device in accordance with an embodiment. Switching or routing device 401 may be configured with multiple ports 402. The ports 402 may be controlled by at least one controller ASIC (application specific integrated circuit) 404. ASIC 404 may include a conflict handler circuit 414.

The device 401 may transfer (i.e., "switch" or "route") packets between ports by way of a switch or router core 408 (e.g., a backplane, fabric chip, stacking connection, another switch chip, etc.), which interconnects the ports. A system processor 410 and memory 412 may be used to control device 401.

It will be appreciated that embodiments can be realized in the form of hardware, software module or a combination of hardware and the software module. Any such software module, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a non-transitory computer-readable storage medium that are suitable for storing a program or programs that, when executed, for example by a processor, implement embodiments. Accordingly, embodiments provide a program comprising code for implementing a system or method as claimed in any preceding claim and a non-transitory computer readable storage medium storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for handling of conflicts in a multicast routing election in a multicast network, the multicast network including a plurality of multicast network devices, the method comprising:
   receiving a packet by a first network device of the plurality of multicast network devices;
   determining whether the packet is a Designated Forwarder (DF) election winner message;
   in response to determining that the packet is the DF election winner message, determining, by the first network device, whether a conflict in a DF election is detected for a link, wherein determining that the conflict in the DF election is detected for the link comprises:
      comparing information in the DF election winner message with information stored in the first network device,
      indicating the conflict in the DF election in response to a match between the information in the DF election winner message and the information stored in the first network device; and
   disabling a DF routing capability of the first network device in response to detecting of the conflict.

2. The method of claim 1, wherein detecting the conflict comprises determining that more than one network device of the plurality of multicast network devices are identified as a DF for the link.

3. The method of claim 1, wherein the information in the DF election message includes a Rendezvous Point Address (RPA), and the information stored in the first network device includes a Rendezvous Point (RP) table, and wherein the determining that the conflict in the DF election is detected for the link comprises:
   determining an ingress interface of the DF election winner message,
   wherein the comparing comprises determining whether an entry in the RP table matches the RPA and the ingress interface; and
   the conflict is detected in response to finding the matching entry in the RP table.

4. The method of claim 3, further comprising:
   determining an ingress interface of a multicast packet;
   identifying a plurality of egress interfaces corresponding to the ingress interface of the multicast packet and a multicast group in a Multicast Routing Table (MRT);
   determining an RP index corresponding to the ingress interface and the multicast group;
   identifying a plurality of valid interfaces corresponding to the RP index in the RP table; and
   transmitting the multicast packet on egress on a final egress interface, wherein the final egress interface is an interface in the plurality of egress interfaces, and where the final egress interface is an interface in the plurality of valid interfaces.

5. The method of claim 1, wherein disabling the DF routing capability comprises:
   identifying an ingress interface of the DF election winner message; and
   preventing the first network device from routing network traffic on egress to the identified ingress interface.

6. A network device for use in a multicast network including a plurality of multicast network devices, the method comprising:
   a conflict handler comprising hardware and to:
      detect a Designated Forwarder (DF) election winner message;
      detect a conflict in a DF election for a link, wherein the detecting of the conflict comprises:
         comparing information in the DF election winner message with information stored in the network device,
         indicating the conflict in the DF election in response to a match between the information in the DF election winner message and the information stored in the network device;
      determine an interface through which the DF election winner message was received on ingress, wherein the interface is associated with a Rendezvous Point Address (RPA); and
      remove the interface from a list of routable egress interfaces in the network device.

7. The network device of claim 6, further comprising:
   a switch or router core to route network traffic using the list of routable egress interfaces, wherein the routing of the network traffic on egress is disabled on the removed interface.

8. The network device of claim 7, wherein the switch or router core is to route the network traffic by:
   determining an ingress interface of a multicast packet;
   identifying a plurality of egress interfaces corresponding to the ingress interface of the multicast packet and a multicast group in a Multicast Routing Table (MRT);
   determining a Rendezvous Point (RP) index corresponding to the ingress interface and the multicast group;
   identifying a plurality of valid interfaces corresponding to the RP index in a Rendezvous Point (RP) table; and
   transmitting the multicast packet on egress on a final egress interface, wherein the final egress interface is an interface in the plurality of egress interfaces, and where the final egress interface is an interface in the plurality of valid interfaces.

9. The network device of claim 6, wherein the detecting of the conflict comprises determining that more than one network device of the plurality of multicast network devices are identified as a DF for the link.

10. The network device of claim 6, wherein the information in the DF election winner message includes an RPA, and the information stored in the network device includes a Rendezvous Point (RP) table, and the comparing comprises determining whether an entry in the RP table matches the RPA in the DF election winner message and the interface, and the conflict is detected in response to finding the matching entry in the RP table.

11. A non-transitory machine-readable storage medium storing instructions for handling of conflicts in a multicast routing election in a multicast network, the multicast network including a plurality of multicast network devices, the instructions upon execution causing a first network device of the plurality of multicast network devices to:

receive a packet by the first network device;

determine, by the first network device, the packet is a Designated Forwarder (DF) election winner message;

detect, by the first network device, a conflict in a DF election for a link based on the DF election winner message; and disable a DF routing capability of the first network device in response to detection of the conflict.

12. The non-transitory machine-readable storage medium of claim 11, wherein detecting the conflict comprises:

comparing information in the DF election winner message with information stored in the first network device, indicating the conflict in the DF election in response to a match between the information in the DF election winner message and the information stored in the first network device.

13. The non-transitory machine-readable storage medium of claim 12, wherein the information in the DF election winner message includes a Rendezvous Point Address (RPA), and the information stored in the first network device includes a Rendezvous Point (RP) table, the instructions upon execution causing the first network device to:

determine an ingress interface of the DF election winner message, wherein the comparing comprises determining whether an entry in the RP table matches the RPA and the ingress interface, and the conflict is detected in response to finding the matching entry in the RP table.

14. The non-transitory machine-readable storage medium of claim 13, wherein the instructions upon execution causing the first network device to:

determine an ingress interface of a multicast packet;

identify a plurality of egress interfaces corresponding to the ingress interface of the multicast packet and a multicast group in a Multicast Routing Table (MRT);

determine an RP index corresponding to the ingress interface and the multicast group;

identify a plurality of valid interfaces corresponding to the RP index in the RP table; and transmit the multicast packet on egress on a final egress interface, wherein the final egress interface is an interface in the plurality of egress interfaces, and where the final egress interface is an interface in the plurality of valid interfaces.

15. The method of claim 1, wherein the DF election winner message is received from a second network device of the plurality of multicast network devices, the DF election winner message declaring that the second network device is the DF for the link.

16. The method of claim 3, wherein the RP table correlates RPAs to respective routable egress interfaces.

17. The method of claim 16, wherein the routable egress interfaces identified in the RP table comprise VLANs.

18. The network device of claim 6, wherein the DF election winner message is received from a second network device of the plurality of multicast network devices, the DF election winner message declaring that the second network device is the DF for the link.

19. The network device of claim 10, wherein the RP table correlates RPAs to respective routable egress interfaces.

20. The non-transitory machine-readable storage medium of claim 11, wherein detecting the conflict comprises determining that more than one network device of the plurality of multicast network devices are identified as a DF for the link.

* * * * *